US008731752B2

(12) United States Patent
Yu et al.

(10) Patent No.: US 8,731,752 B2
(45) Date of Patent: May 20, 2014

(54) DISTANCE BASED BATTERY CHARGE DEPLETION CONTROL FOR PHEV ENERGY MANAGEMENT

(75) Inventors: Hai Yu, Canton, MI (US); Ming L. Kuang, Canton, MI (US); Ryan McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 565 days.

(21) Appl. No.: 12/985,473

(22) Filed: Jan. 6, 2011

(65) Prior Publication Data

US 2011/0166732 A1    Jul. 7, 2011

Related U.S. Application Data

(60) Provisional application No. 61/335,447, filed on Jan. 6, 2010.

(51) Int. Cl.
*G06F 7/00* (2006.01)
*B60L 11/00* (2006.01)
*B60W 10/04* (2006.01)

(52) U.S. Cl.
CPC ............ *B60W 10/04* (2013.01); *G06F 7/00* (2013.01); *B60L 11/00* (2013.01)
USPC ........... 701/22; 701/36; 701/123; 180/65.265

(58) Field of Classification Search
USPC .............. 701/22, 36, 123; 180/65.2, 65.265, 180/65.275, 65.29
See application file for complete search history.

(56) References Cited

U.S. PATENT DOCUMENTS

| 7,539,562 | B2 | 5/2009 | Maguire et al. |
| 2006/0278449 | A1* | 12/2006 | Torre-Bueno ............... 180/65.2 |
| 2009/0114463 | A1* | 5/2009 | DeVault .................... 180/65.29 |
| 2009/0150015 | A1* | 6/2009 | Okubo et al. ................. 701/22 |
| 2009/0259363 | A1* | 10/2009 | Li et al. ...................... 701/36 |
| 2011/0066308 | A1* | 3/2011 | Yang et al. ................... 701/22 |

OTHER PUBLICATIONS

DeVault, "Just-In-Time Battery Charge Depletion Control for PHEVs and E-REVs for Maximum Battery Life", SAE International, Apr. 20, 2009, 11 pages.
Gong et al., "Trip Based Optimal Power Management of Plug-in Hybrid Electric Vehicle with Advanced Traffic Modeling", SAE International, Apr. 14-17, 2008, 14 pages.

* cited by examiner

*Primary Examiner* — Helal A Algahaim
*Assistant Examiner* — Dale W Hilgendorf
(74) *Attorney, Agent, or Firm* — Brooks Kushman P.C.; David B. Kelley

(57) ABSTRACT

In a plug-in hybrid electric vehicle (PHEV), the vehicle may be operated in a charge-depleting (CD) mode to ensure that the battery is effectively discharged or in a charge-sustaining (CS) mode in which the battery state of charge is maintained by operating the internal combustion engine predominantly for propulsion. In trips that are longer than that which fully depletes the battery storage, it is possible to control the proportion in a manner that is between CS and CD modes to provide overall higher efficiency while still effectively discharging the battery over the course of the trip. Such higher efficiency operation is possible when information about the distance until the next charging event is available.

12 Claims, 10 Drawing Sheets

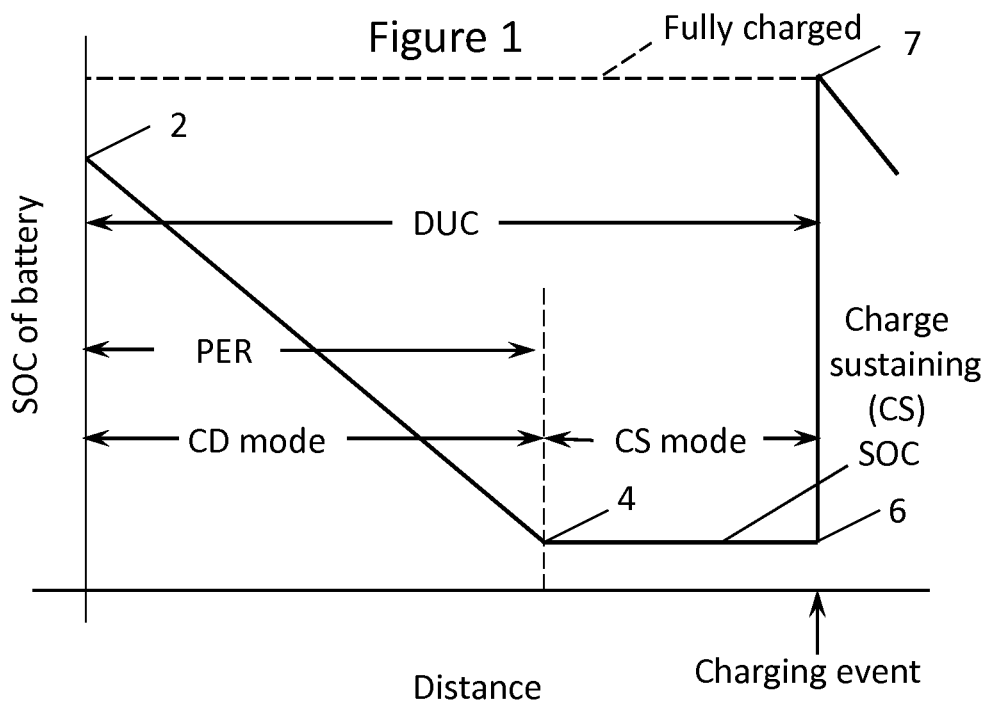
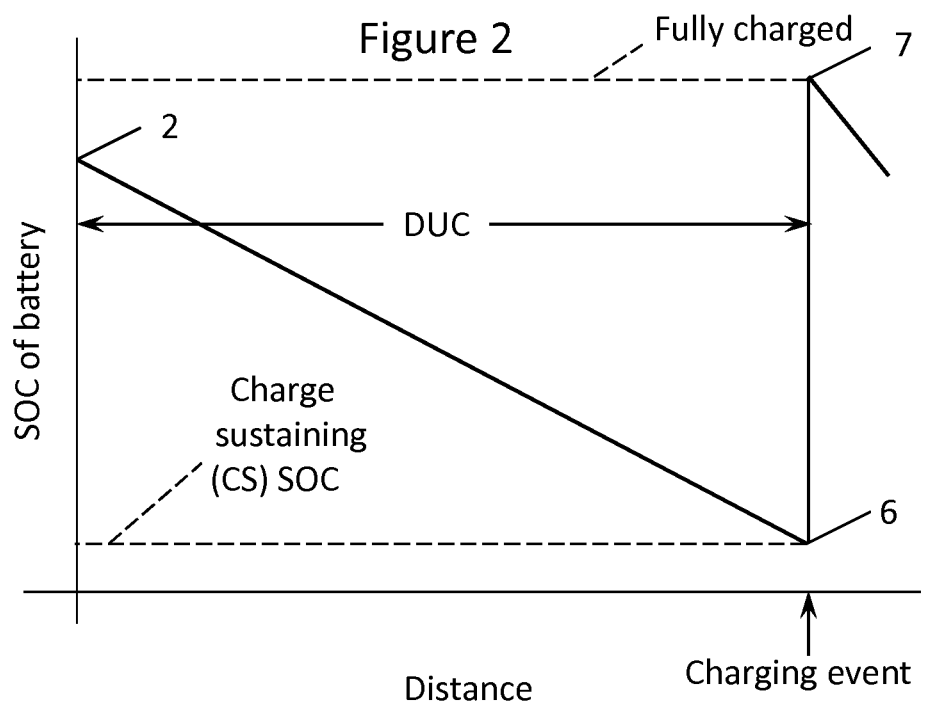

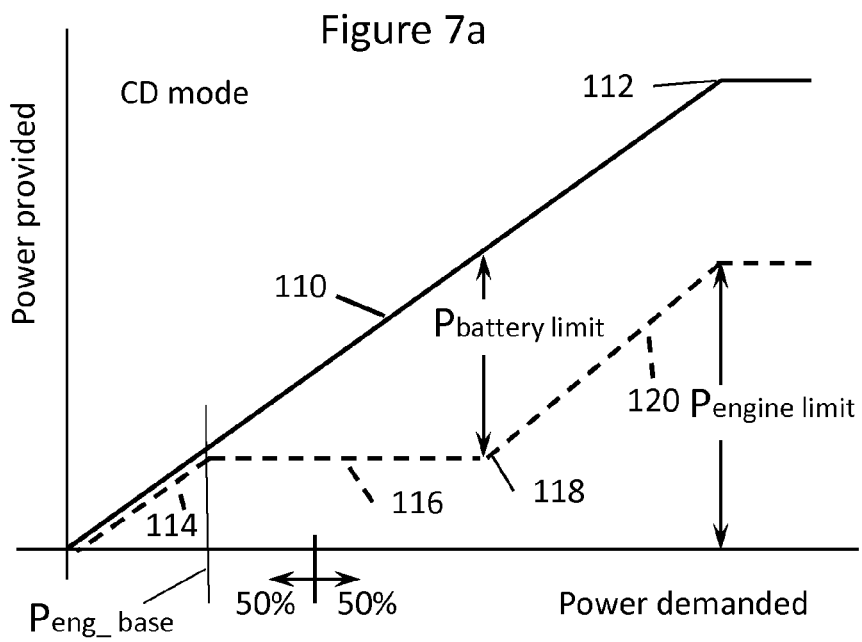
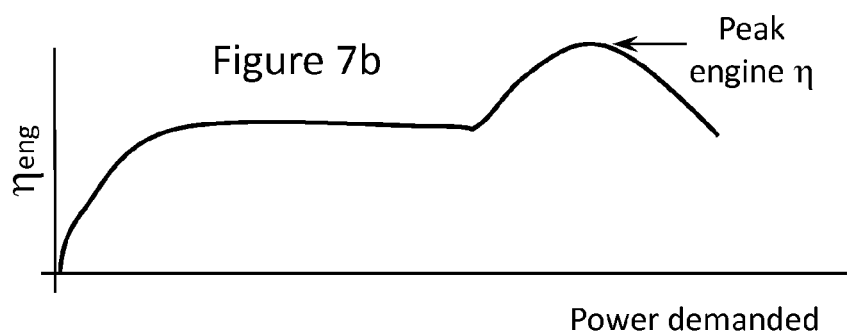
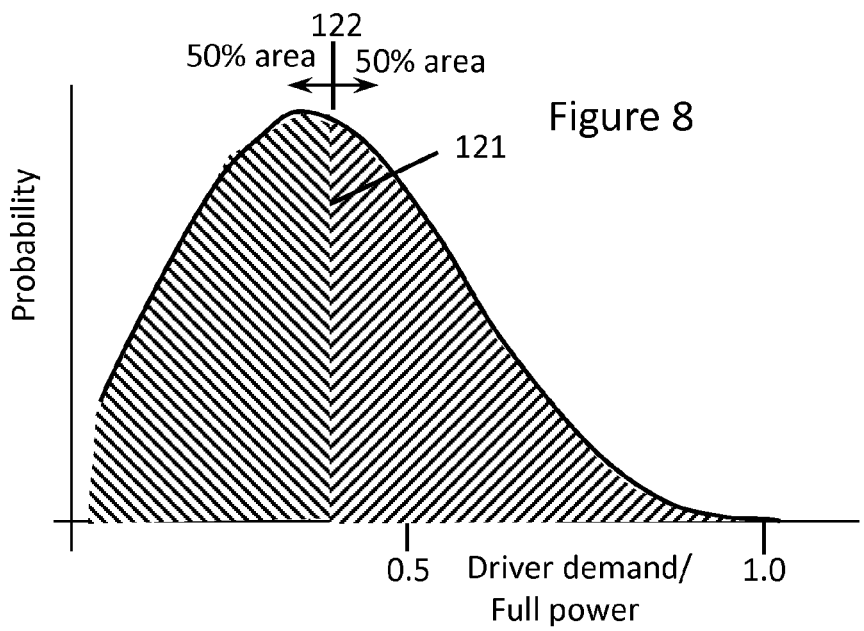

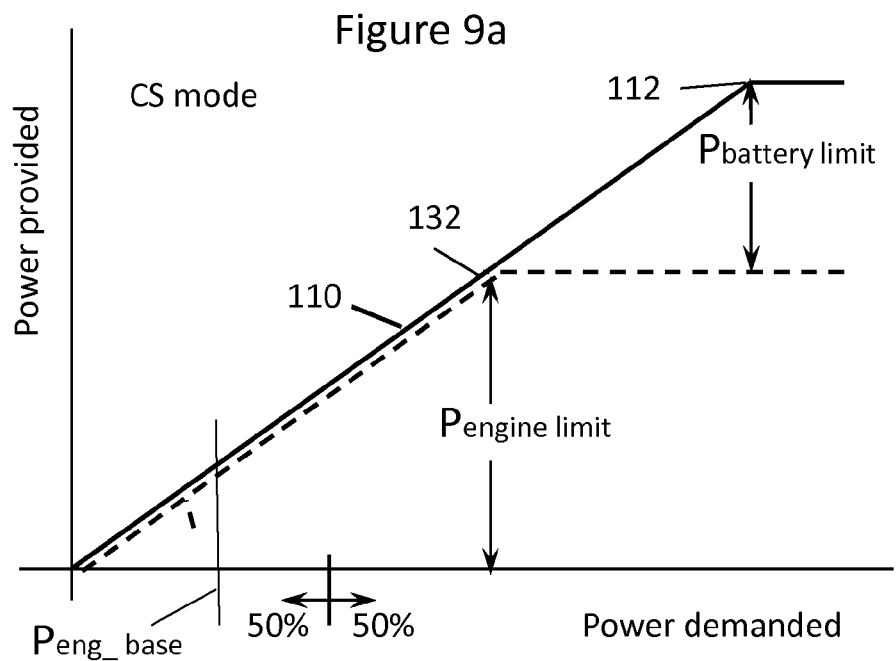
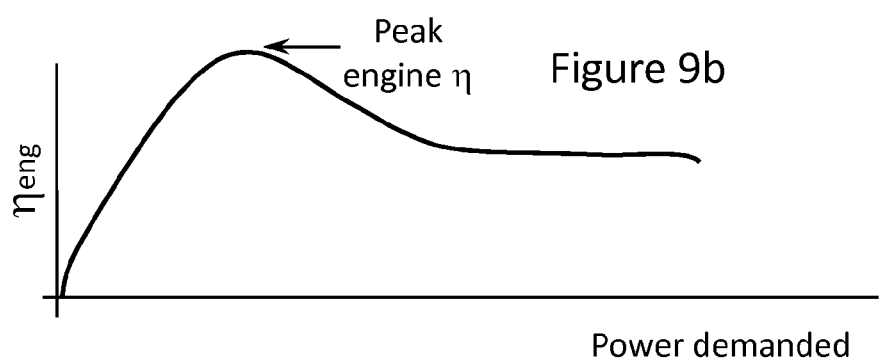

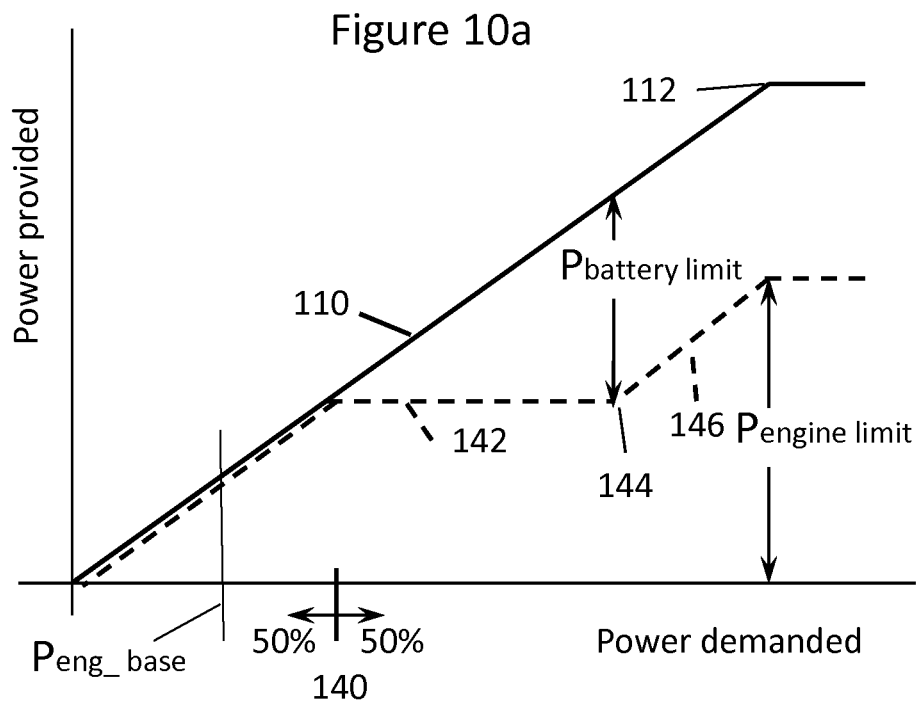
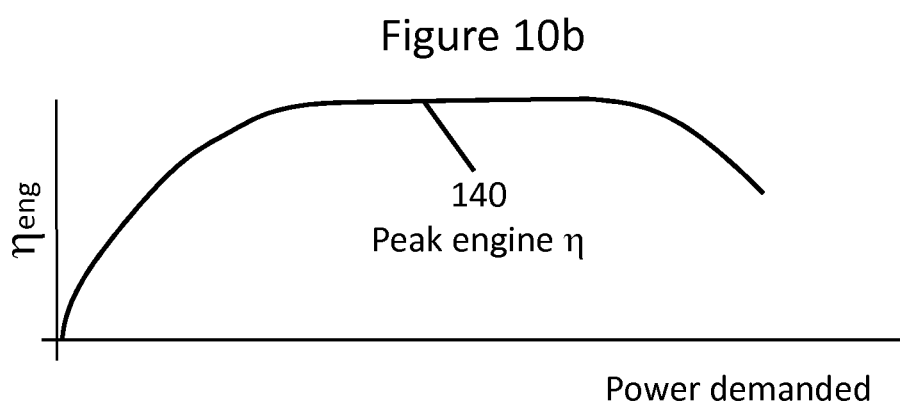

DISTANCE BASED BATTERY CHARGE DEPLETION CONTROL FOR PHEV ENERGY MANAGEMENT

CROSS-REFERENCE TO RELATED APPLICATIONS

This application claims the benefit of U.S. provisional application Ser. No. 61/335,447 filed Jan. 6, 2010.

TECHNICAL FIELD

The present disclosure is related to electric energy management in a plug-in hybrid electric vehicle.

BACKGROUND

Plug-in Hybrid Electric Vehicles (PHEV) are an extension of existing hybrid electric vehicle (HEV) technology, in which a gasoline engine is supplemented by an electric battery pack and electric machines to gain increased mileage and reduced vehicle emissions. A PHEV utilizes a larger capacity battery pack than a standard HEV and it adds capability of recharging the battery from a standard electrical outlet. Because the battery pack has a larger capacity, the PHEV can be operated primarily by electric propulsion for a substantial distance, for example, a primary electric vehicle operation range (PER) of 10-40 miles, after a full battery recharges. The engine is only started to assist vehicle propulsion in limited circumstances such as high speed and/or high power demand operations due to system constraints. Such electrical-only or electrical-primarily operation is called EV or PEV operating mode, respectively. After the usable battery electricity is depleted, the engine takes over the primary role in vehicle propulsion by consuming fuel energy. By relying on electrical energy from the grid to charge the battery and then using that energy for a significant fraction of vehicle travel, the amount of fuel consumed by the PHEV is greatly reduced, especially when the traveling distance is close to the primary EV range.

Conventional HEVs buffer fuel energy and recover kinematic energy in electric form to improve the overall vehicle system operating efficiency. The fuel is the only energy source in general. For PHEVs, there is one additional source of energy; i.e. the amount of electric energy from the grid deposited in the battery after each battery charge event.

While conventional HEVs are operated to maintain the battery state of charge (SOC) at a nearly constant level, a PHEV uses as much pre-saved battery electric (grid) energy as possible before the next battery charge event; i.e. the relatively lower cost grid-supplied electric energy is expected to be used in priority and primarily for propulsion and for other vehicle functions after each charge. After the battery SOC decreases to a desired sustaining level or a lowest conservative level, the PHEV resumes operation as a conventional HEV. If no information is provided as to the expected driving distance until charge (DUC), in order to ensure that the grid-supplied electric energy is expended, the base PHEV control strategy always largely uses up the electric energy first and the engine takes over the leading role in vehicle propulsion when the battery is substantially discharged.

In FIG. 1, the two basic operation states of a PHEV: charge depleting (CD) and charge sustaining (CS) are illustrated. In the example shown in FIG. 1, a mostly charged PHEV (shown at a level 2 which is less than fully charged) is driven in the CD state for the first part of the trip, where the battery's state of charge (SOC) exhibits a net decrease between points 2 and 4. Due to the lower cost of electricity compared to fuel, the available battery electric energy is used for vehicle usage function before the next PHEV plug-in recharge event to largely displace fuel consumption. Since knowledge of the occurrence of the next battery recharge event is usually unknown, by default, the PHEV operation starts with CD process to assure battery depletion before the end of the trip.

During the CD operating state, according to the base PHEV energy management strategy, the battery's electric energy is used primarily to propel the vehicle, thereby maximally or near maximally depleting the electric energy stored in the battery. By primarily utilizing the battery energy to propel the vehicle early in the trip, the PHEV fuel consumption is minimized when the trip distance is close to the PER in EV/PEV (electric vehicle operation or in blended operation in which the internal combustion engine is used as little as possible) operations. Fully-charged PHEVs have an e.g. 10-40 mile PER in certain driving cycles, with the PER depending on the design goals, and thus the size of the battery pack, of the PHEV, as well as the driving cycles. At point 6, the trip has ended, the battery is recharged and attains the fully charged condition at point 7.

For example, let the total driver demanded PHEV drive power be $P_{demand}$, the engine output power be $P_{eng}$, the battery power be $P_{batt}$ and the electric power loss be $P_{eloss}$, the following power balance equation holds for a PHEV:

$$P_{demand} = P_{eng} + P_{batt} - P_{eloss}$$

For simplicity, ignoring the battery internal energy loss and voltage variation, the change rate of state of charge is:

$$dSOC/dt = \Delta SOC/\Delta t = P_{batt}/(Q_{batt} * V_{batt})$$

where $Q_{batt}$ is battery capacity in Ampere-hours and $V_{batt}$ is the battery voltage is Volts.

When the engine is operating, the fuel consumption rate can be approximated by:

$$dFu/dt = \Delta \text{fuel}/\Delta t = K * P_{eng}/\eta_{eng}$$

where K is a simplified version of the fuel energy conversion ratio and $\eta_{eng}$ is the engine power efficiency.

While the PHEV is operating in the CD state, it is consuming the useful battery SOC (the amount of battery SOC above a determined sustaining level) as much as possible to minimize fuel consumption before the next plug-in charge event. The PHEV is operated in EV mode when engine-on operation is not necessary, such that:

$$P_{demand} = P_{batt} - P_{eloss}$$

and no fuel consumption occurs.

When engine-on operation is needed due to system constraints, such as vehicle speed limit or drive power limit, etc. or due to drive power assistance requirements in CD state, the engine power is limited to a low level in order to use $P_{batt}$ for primarily electric energy consumption:

$$P_{batt} = P_{demand} + P_{eloss} - P_{eng}$$

Since $P_{eloss}$ is usually small, it is ignored in the following descriptions for simplification.

In this case, the engine power is commanded at a minimum level between the drive power demand, $P_{demand}$, and a predetermined constant base power level, $P_{eng\_base} \geq 0$, if the battery power limit is not violated. Assume the engine is operated along a system optimal curve, and the base engine power level, $P_{eng\_base}$, is fixed at a constant small value with acceptable engine operating power efficiency to minimize fuel consumption in a trip with distance close to PER under a certain driving cycle. In the following description, the PHEV operation in CD state with maximal/near-maximal battery depletion strategy will be called Maximal Charge Depletion (MCD) state.

Once the battery's SOC decreases to a predetermined sustaining level (shown as point 4), the vehicle switches to the CS state, where the battery's SOC is kept within a certain range close to the desired sustaining SOC level. In CS mode, the vehicle is mainly powered by the engine (fuel energy), as is in a conventional HEV.

In summary, without knowledge of the occurrence of the next battery plugin recharge event, the PHEV operation is in favor of EV/PEV operation to use available battery electric energy for vehicle propulsion to displace fuel consumption during MCD operation. The PHEV is propelled at maximal/near-maximal battery power until point 4 is reached. The engine is kept in an off state or is kept at a low power level when on. After the usable battery SOC is depleted at point 4, the PHEV operation will in favor of HEV operation and it will be propelled primarily by the engine while the battery SOC is maintained around a constant sustaining level (CS from points 4 to 6).

SUMMARY

According to an embodiment of the disclosure, the vehicle total estimated travel distance between two consecutive battery charge events, called Distance Until Charge (DUC), is known, possibly through driver input, knowledge-based driving pattern and charge cycle estimations/predictions, driver input to a GPS unit, etc. The basic way to control the vehicle, as shown in FIG. 1, is to operate in the MCD state during the early part of the trip to largely use the electrical energy stored in the battery and then follow that with CS mode operation. However, according to various embodiments of the disclosure, the Battery State of Charge (SOC) can decrease following various SOC depletion profiles throughout the DUC, including linear, curvilinear, stepped, or the like. One example of the SOC profile in the distance domain is the substantially linear depletion throughout the DUC. Without loss of generality, the linear SOC depletion profile will be used as an example in the following descriptions without excluding other forms of SOC profiles like piecewise linear lines, nonlinear curves, etc. As will be described below in detail, such a strategy improves overall operational efficiency thereby reducing fuel consumption by the PHEV with minimal level of trip preview information.

The total consumption of electrical energy is the same for the strategies illustrated in FIGS. 1 and 2 because the battery starts at the same SOC, point 2, and ends at the same SOC, point 6. The case where the controlled driving process is not the full DUC range but a segment in a trip for which a reference SOC depletion profile is available connecting an initial SOC level to a end SOC level within this trip section is also contemplated.

Based on the base PHEV depletion strategy (as shown in FIG. 1), minimal fuel consumption can be achieved if the total trip distance traveled before the next battery charge is equal to or close to the designed PER for a certain driving cycle However, if the total distance traveled between battery charges is much longer than the PER, the energy usage is not optimized along the trip. During the CD portion of the trip, the engine may be operated a minimal amount even at a low efficiency such that very little fuel is consumed. However, during the CS portion of the trip, when the engine takes over to provide the majority of the vehicle propulsion, the engine may not be operating in its higher efficiency engine operating ranges due to high driver power demand, and the fuel usage in the CS part of the trip may be considerable. It is desirable to balance the battery electric power across the trip domain such that a more optimal coordinated power allocation among the two sources of energy can be achieved to further improve the fuel economy along the total traveling distance.

On the other hand, if the total distance traveled between battery charges is less than the PER, the base PHEV depletion strategy may not maximally consume the battery electricity. One possibility is to further increase the battery electricity consumption intensity and thus further minimize fuel consumption.

To this end, vehicle usage information, such as the distance until battery charge, DUC, is used in an advanced energy management strategy. The DUC information can be obtained from a vehicle human machine interface (HMI) with driver input, or from a GPS vehicle navigation system, or even from intelligent vehicle usage/driving pattern recognition.

Given DUC information, the usage of the battery electric energy can be optimally preplanned to form a SOC profile in the spatial domain up to the DUC range. Along such an SOC profile, the engine power and the battery power are optimally balanced in satisfying drive power to improve fuel economy, enhance battery durability, improve vehicle drivability, and improve vehicle performance.

For the example of fuel economy improvement, one of the assumptions underlying the strategy is that the electrical power path (battery, electrical machines, etc.) has comparatively consistent high power efficiency, which quite accurately predicts reality. Thus, to improve overall efficiency, the engine operation efficiency should be improved along the trip with a more optimized power sourcing strategy.

According to an embodiment of the disclosure, if DUC is close to the base PER, illustrated in FIG. 1, the PHEV is operated in CD mode throughout the trip. If DUC is different from the base PER, the battery electric energy is used in a controlled manner following a desired reference SOC profile in the trip/spatial domain. To this end, a variable battery SOC depletion control strategy is used for PHEV energy management controls. The new control strategy includes a dynamic Engine Pull-Up and Pull-Down (EPUD) state control method and a variable drive power distribution control method.

The dynamic EPUD continuously adjusts the drive power threshold levels for engine pull up and pull down determination such that the proportion of EV operation duration can be adjusted.

When the engine is on and the PHEV is operated in HEV mode, the variable drive power distribution control method adjusts the ratio of drive power distribution to the engine and to the battery to control the battery SOC depletion rate.

Under the present PHEV energy management strategy, the battery SOC depletion rate is controlled such that it corresponds to that dictated by the reference SOC profile.

DESCRIPTION OF THE DRAWINGS

FIG. 1 illustrates an example plot of a battery SOC vs. trip distance for a default strategy for a PHEV to complete a trip that is longer than the PER of certain driving cycles without involving trip information;

FIG. 2 illustrates an example plot of battery SOC vs. trip distance for an advanced strategy for a PHEV to complete a trip that is longer than the PER of certain driving cycle using at least the DUC information according to an embodiment;

FIGS. 7a, 9a, and 10a show three scenarios of how demanded power is provided by the combination of engine power and electric motor power (battery power) for a charge depletion mode, a charge sustaining mode, and an intermediate mode, respectively and according to various embodiments;

FIGS. 7b, 9b, and 10b show the engine efficiency as a function of power demanded associated with the three modes illustrated in FIGS. 7a, 9a, and 10a, respectively and according to various embodiments;

FIG. 8 shows a frequency distribution of normalized driver demand;

DETAILED DESCRIPTION

Figure 3:
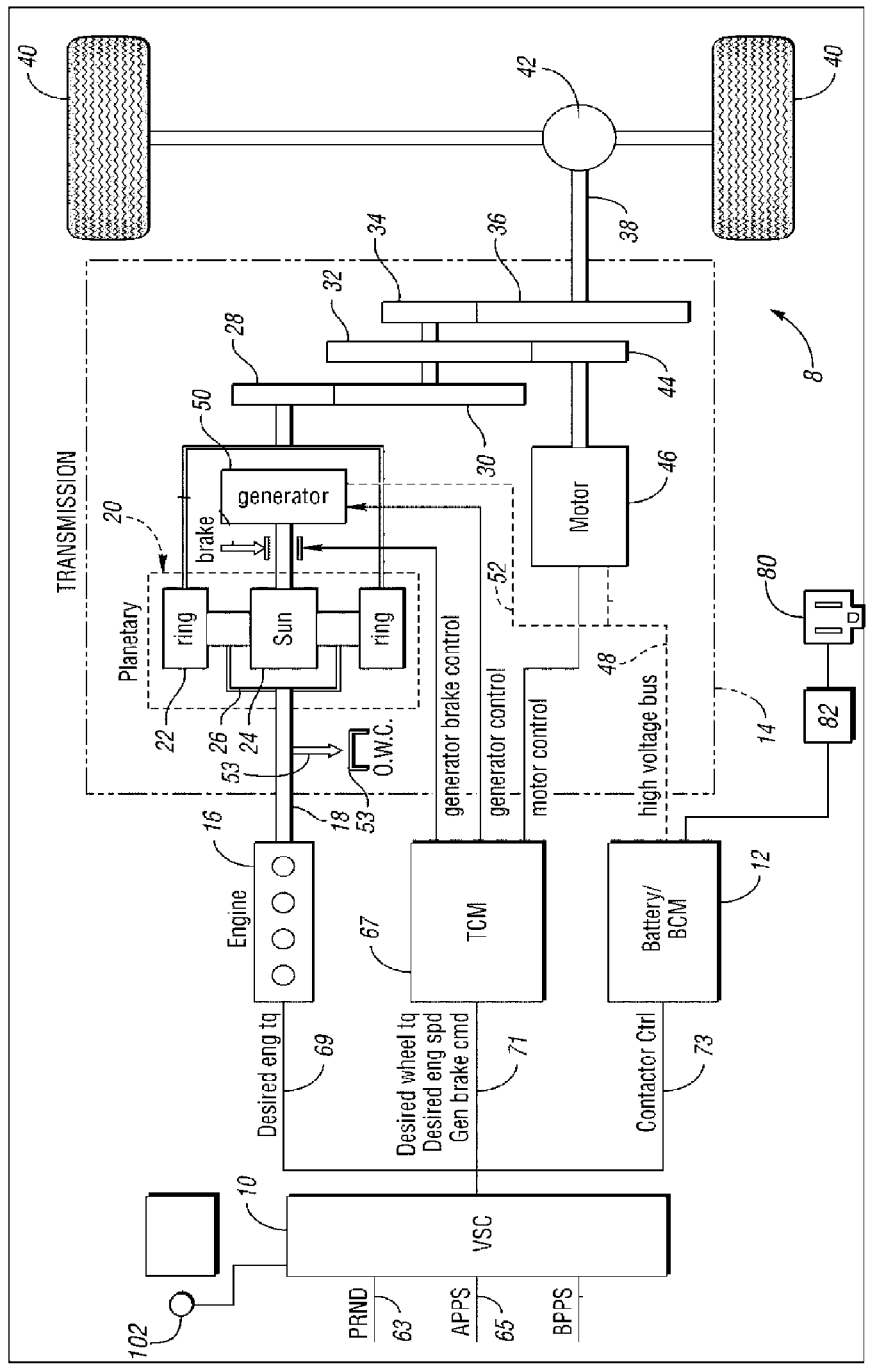
FIG. 3 is a schematic drawing of an example of a power split powertrain system configuration according to an embodiment.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

During the driving period shown as DUC in FIG. 1, the vehicle is operating in either the MCD state or the CS state, i.e., one of the extremes. An alternative power management strategy for PHEVs may have the potential to allocate driver power demand between the two propulsion devices in a more optimally balanced way than either CD or CS states. By providing or assuming knowledge of the total distance that the PHEV plans to travel before the next battery charge event, the new PHEV battery operating state is called Extended Charge Depletion (ECD) state (shown in FIG. 2), which extends the battery charge depletion state to the entire DUC or to a segment of a trip by replacing the MCD plus CS process (shown in FIG. 1). During the ECD state, the PHEV powertrain is managed in a blended operating mode in which the engine and the battery are more optimally coordinated in satisfying the drive power demand. The drive power allocation to both energy sources is dynamically adjusted in order to achieve a desired battery electricity depletion rate. As a result, the battery SOC under the controlled process follows a desired reference SOC profile in the spatial domain. The reference SOC profile may be designed with scalable trip information depending on availability. At the minimal level, the drive distance between consecutive battery charges is required. This battery SOC profile not only assures battery depletion before the end of DUC, but also dictates the battery power along the trip by the Electricity Depletion Rate (EDR) along the reference SOC profile. The battery SOC profile can be designed for fuel economy improvement, battery protection, battery durability maximization, energy conservation, or the like. The battery SOC profile may be linear, curvilinear, stepped, or any other combination of declines and/or constant holds. Without loss of generality, the reference SOC profile primarily discussed in this invention disclosure is designed for fuel economy improvement by assuming charge cycle distance information knowledge a priori.

Figure 4:
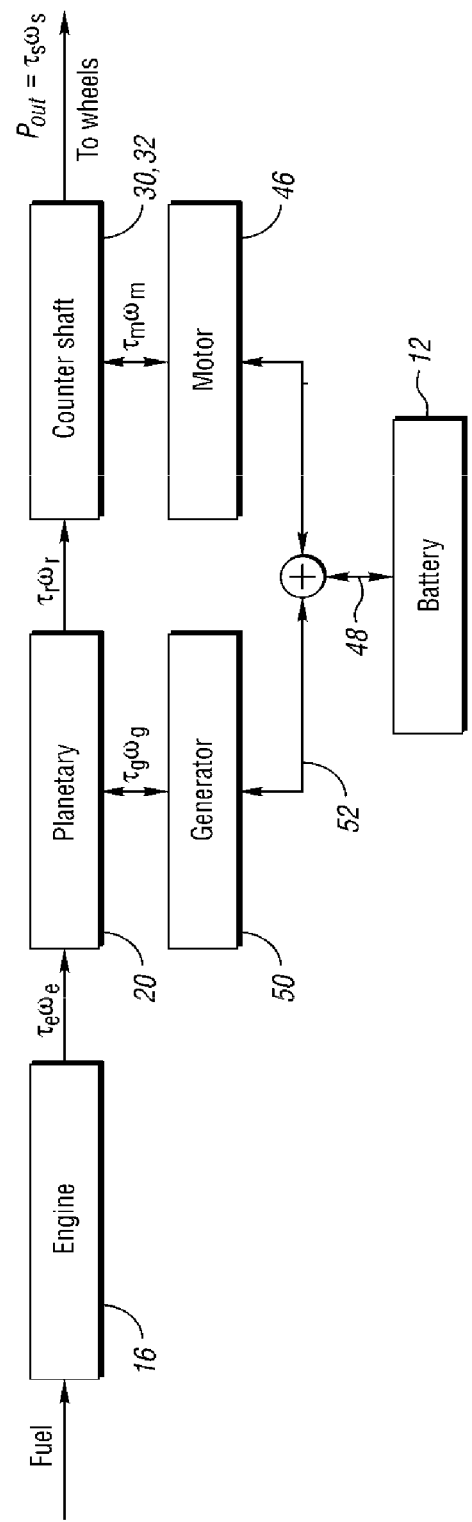
FIG. 4 is a powertrain system power flow diagram according to an embodiment.

A power split PHEV configuration is illustrated in FIGS. 3 and 4. However this is for example purposes only and not intended to be limiting as the present disclosure applies to PHEVs of any suitable architecture.

One type of HEV powertrain configuration for an HEV 8 is illustrated schematically in FIG. 3. The control of the vehicle 8 can be configured variously. In the example shown in FIG. 3, a vehicle system controller 10 communicates with a battery and battery control module 12, and a control module 67 for a transmission 14. An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery of module 12 delivers electric power to the motor through power flow path 48. Generator 50 is connected electrically to the battery and to the motor in known fashion, as shown at 52.

In FIG. 3, the vehicle system controller 10 receives a signal at 63 from a transmission range selector, which is distributed to transmission control module 67, together with a desired wheel torque, a desired engine speed and a generator brake command, as shown at 71. A battery contactor or switch 73 is closed after a vehicle "key-on" startup. The controller 10 issues a desired engine torque request to engine 16, as shown at 69, which is dependent on accelerator pedal position sensor output 65.

As mentioned previously, there are two power sources for the driveline. The first power source is a combination of the engine and generator subsystems, which are connected together using the planetary gear unit 20. The other power source involves only the electric drive system including the motor, the generator and the battery, wherein the battery acts as an energy storage medium for the generator and the motor.

The second source of power, is the battery, generator and motor subsystem. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

A plug-in hybrid electric vehicle (PHEV) is an extension of existing hybrid electric vehicle (HEV) technology, in which an internal combustion engine is supplemented by an electric battery pack and electric machines to further gain increased mileage and reduced vehicle emissions. A PHEV utilizes a larger capacity battery pack than a standard hybrid vehicle and adds the capability to recharge the battery from a standard electrical outlet to decrease onboard fuel consumption to further improve the vehicle's fuel economy in the electric driving mode or in the fuel/electricity blended driving mode. Referring once again to FIG. 3, if HEV 8 is a PHEV, it includes a receptacle 80 which is connected to the power grid or outside electrical source and that is coupled to battery 12, possibly through a battery charger/converter 82. Referring to FIG. 4, receptacle 80 (no shown) may be connected to the battery for recharging from an outside electrical power source.

In some applications, the vehicle further includes a user input device such as button 102 to indicate an intention to VSC 10 of expected/estimated driving distance to the station of the next battery charge event. Furthermore, PHEV 8 has a driver display that provides information, e.g., GPS output, as well as interface into which the driver may provide route information or request additional information. These information system provide perceived or predicted trip information, such as DUC, driving patterns, driver power profile, etc., to the PHEV control strategy.

Conventional HEVs buffer fuel energy and recover kinematic energy in electric form to improve the overall vehicle system operating efficiency. The fuel is the only energy source. For PHEVs, there is an additional source of energy—the amount of electric energy deposited in the battery from the grid during battery charge events. A power management strategy for PHEVs has the potential to allocate the drive power demand between the two energy sources to achieve better fuel economy or improved drivability while still satisfying the other objectives. While conventional HEVs are operated to maintain the battery state of charge (SOC) around a constant level, PHEVs use as much pre-saved battery electric (grid) energy as possible before the next battery charge event, i.e., it is desirable to fully use the relatively cheap grid supplied electric energy after each plug-in charge event. After the battery SOC depletes to a lowest conservative level, the PHEV operates as a conventional HEV operating about the lowest conservative level for the battery.

Figure 5:
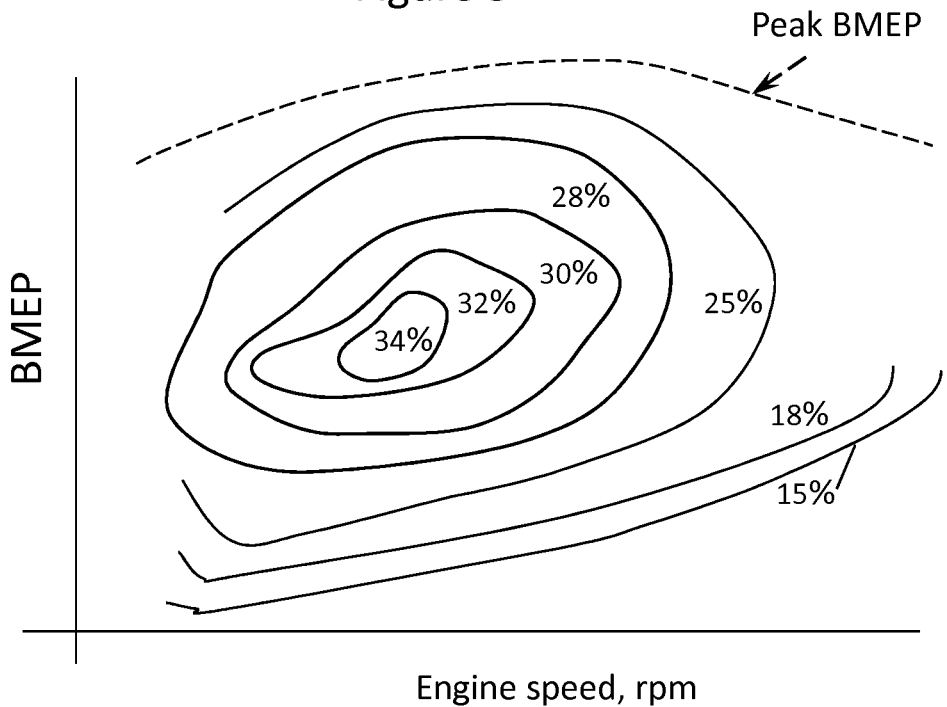
FIG. 5 is a thermal efficiency (related to fuel economy) map plotted as a function of engine speed and BMEP (proportional to torque) for a sample spark-ignition engine.
Figure 6:
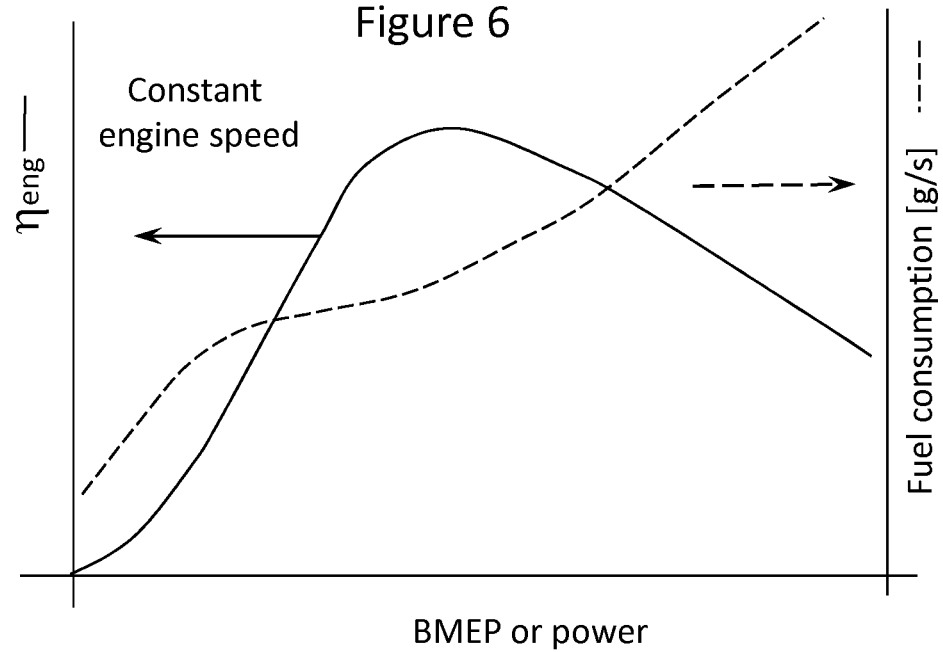
FIG. 6 illustrates how thermal efficiency varies with BMEP and with power at a constant engine speed.

Referring now to FIG. 5, a typical fuel economy map for an internal combustion engine shows thermal efficiency (η) islands as a function of engine speed and brake mean effective power (BMEP), related to engine torque. The dashed curve at the top indicates the peak BMEP that the example engine can produce, i.e., the bounds of engine torque as a function of speed. For a simplistic example, at a constant engine speed as taken along dotted line in FIG. 5, thermal efficiency as a function of BMEP can be plotted and is shown in FIG. 6. More detailed, similar thermal efficiency curves may be plotted along a PHEV system efficiency operating curve. As power is proportional to BMEP multiplied by engine speed and FIG. 6 is for constant engine speed, N, the x-axis of FIG. 6 is also proportional to engine power. The solid curve in FIG. 6 illustrates that thermal efficiency of the engine is very poor at low BMEP conditions, peaks at about half of full power and reduces as BMEP is further increased. Also plotted in FIG. 6 with a dashed line is fuel consumption, in mass per unit time, e.g., units are g/s. The fuel consumption rises rapidly at low loads, flattens out in the range of BMEP (or engine power) in which thermal efficiency peaks and then rises rapidly again at the very high BMEP levels (or engine power).

Referring now to FIG. 7a, power demanded by the vehicle operator is plotted against power provided on the y axis at a particular vehicle speed. The total power provided is shown as solid line no. The total power provided meets driver demand until point 112 at which the maximum power of the engine and electric motor (due to limits of the electric motor and/or discharge limits of the battery) are reached and no additional power can be provided. In FIG. 7a, the vehicle speed is one at which the internal combustion engine rotates. As the engine is running, it is desirable at the lowest power levels, to provide the demanded power exclusively, or at least primarily, by the internal combustion engine such that the engine operating efficiency is maintained at an acceptable low level while assuring largely battery energy utilization. This is shown as dashed line 114. When the power demand is greater than a $P_{eng\_base}$, the battery provides the additional demanded power. Thus, engine power remains constant, as shown by dashed line 116. At point 118, the battery (or motor) limit is attained and the electric motor can provide no further power and the engine provides the increased power, as shown by dashed line 120. This continues until the engine limit is reached. Curve no shows the total power that is provided to the vehicle with the total power being made up of engine power, which is illustrated by the area under lines 114, 116, and 120 and electric motor power. Between curve no and the dashed lines 114, 116, and 120 is the power that the electric motor provides.

The situation illustrated in FIG. 7a is a CD mode of operation. That is, the electric motor is used predominantly, except at power levels below $P_{eng\_base}$ at which it is inefficient to motor the engine. Thus, in situations in which rapid charge depletion of the battery is desired and the vehicle is operating in a primarily electric mode (opposed to a pure electric mode), such a strategy as shown in FIG. 7a is employed. As mentioned above, the data in FIG. 7a are specific to a vehicle speed range where engine-on operation is required. The same strategy applies to other system constraints if only the engine-on operation is needed during battery charge depletion (CD) operation mode.

Referring to FIG. 7b, a plot of engine thermal efficiency is shown. The thermal efficiency rises rapidly from zero power to $P_{eng\_base}$, is constant at an intermediate level in the range corresponding with dashed line 116. At higher power demands, the contribution by the engine is greater, as shown by dashed line 120; engine thermal efficiency rises to a peak and then drops rapidly as engine power exceeds that of the peak efficiency point.

Referring now to FIG. 8, a frequency distribution of power demand for a typical driving cycle is shown. The driver rarely demands over 0.5 of the full power level. The highest probability is for the operator to demand about 25% of full power demand. If the area under the curve is determined, half of the area is to the left of line 121 and half of the area is to the right of line 121. Line 121 intersects the x axis at about 0.35. This is transferred from FIG. 8 onto FIG. 7a to show that the operator power demand falls on the right hand side of point 122 about half the time and on the left hand side of point 122 about half the time, i.e., the power demand is at the lower power levels a majority of the time.

In FIG. 9a, a charge sustaining (CS) mode of operation is shown. That is, the internal combustion engine is used predominantly. The internal combustion engine provides all, or most, of the demanded power, as shown by dotted line 130 until the engine limit is exceeded at point 132. At high power demands, all of the additional power is provided by the electric motor, drawing power from the battery. The battery limit is reached at point 112. Note that the fraction of power provided by the battery and the engine is the same at point 112 in both FIGS. 7a and 9a. In the CS mode case shown in FIG. 9a, the engine is providing all of the power when power demand is less than that illustrated by point 122, i.e., the engine is providing all of the power for well over 50% of the operating time.

The CS mode shown in FIG. 9a is a simplistic version of the CS mode to aid in the present discussion. In reality the breakdown of power assigned to the engine and the electric motor are more complicated than what is shown and is a function of additional variables, as is discussed further below. At the very high power demand levels, it is shown that the electric motor assists the internal combustion engine. However, because the battery is at the CS SOC, which is typically a minimum sustaining charge, it has very little reserve capacity. The electric motor can be applied for a short burst, but cannot support any sustained demand for power. Also, the SOC of the battery does fluctuate some, even in the CS mode because the SOC can increase during regenerative braking for example. This increase in SOC can support operating the electric motor for high power demands as well as assisting the internal combustion at lower power demands so that the internal combustion engine operate at higher efficiency points.

Engine thermal efficiency is plotted as a function of power demanded in FIG. 9b. The engine operates at a high efficiency level for much of the operation of the vehicle. However, in the CS mode of FIG. 9a, fuel is consumed for the majority of the operation and the energy stored in the battery is hardly accessed. If the desire is to use the electric energy stored in the battery because, for example, when electricity from the grid is significantly cheaper than gasoline, the operation shown in FIG. 9a does not satisfy this goal. However, in situations in which the battery energy has been largely depleted, CS operation is indicated and the power demands above point 132 in FIG. 9a can only be accessed for brief bursts to avoid damaging the battery.

An example of the control strategy for use with various reference battery SOC depletion profiles is shown in FIG. 10a, in which the engine provides the all power demanded at power demands lower than the peak efficiency point 140. When the battery energy depletion before the next battery plug-in charge event is known, i.e. the DUC is longer than PER, it is desirable to shift the base engine operation power limit $P_{eng\_base}$ to a higher power level such that the engine operating efficiency can be elevated during battery charge depletion operation period. This is done by changing the dynamic Engine Pull-Up and Pull-Down (EPUD) state control, λ, which continuously adjusts the drive power threshold levels for engine pull up and pull down ($P_{epu}$ and $P_{epd}$) determination such that the proportion of EV operation duration can be adjusted. The variable λ commands the threshold for engine operation on or off. By changing λ, the power level is changed which will trigger the engine to begin or to stop operating, or to continue in its operation state when it would have previously been changed. For example, if the λ command caused the engine threshold to be raised to a higher power level to trigger the engine on or off, meaning that if the engine was previously off, it would not become operational until the higher power level was required. Similarly, an operational engine would turn off at the higher power level. Conversely, if the λ command caused the engine threshold power to be lowered, the power level to trigger the engine on or off changes to this new lower power level, meaning that if the engine was previously off, it would become operational at the lower power level requirement. Similarly, an operational engine would turn off at the lower power level, meaning potentially longer periods of engine operation. By changing λ, the trigger power level for engine pull up and pull down, changing the amount of time that the engine is operational as well as the base power provided by the engine. The corresponding battery electric power is changed to meet vehicle demand leading to a change in the charge depletion of the battery.

The electric motor supplements the engine power in the range of power shown by dashed line 142. At power demands greater than point 144, the battery (or motor) limit is reached and any additional high power demand is supplied by the engine, as shown by dashed line 146. In FIG. 10b, the thermal efficiency is generally elevated in comparison to that in FIG. 7b. It is close to the peak efficiency at the power associated with point 140, remains at or near the peak efficiency in the midrange of power, and drops when the power provided by the engine exceeds the peak efficiency point.

Another example of the invented strategy, in which the engine base power level, $P_{eng\_base}$, is further shifted to the left such that the engine is operated at an even lower power level or even at no power output even though the engine-on operation is required due to system constraints. The PHEV propulsion is dominated by electric power once the drive power demand is higher than the further minimized engine base power level. In this type of operation, even though the engine efficiency is very low, it consumes as the least fuel possible while consuming as much as electric energy as possible. As a result, the battery electric energy is largely depleted to the maximal achievable level when the DUC is less than PER and the fuel consumption is minimized in such kinds of driving trips.

In summary, for overall energy efficiency, it is desirable to operate the engine at its most efficient condition as much as possible when DUC is longer than PER. For fuel consumption minimization, it is desirable to operate the engine at lowest power level as possible when the DUC is shorter than PER since it is often desirable to completely discharge the battery in between charges assuming electricity costs less than gasoline.

This can only be done when trip information, at least DUC, is known or estimated a priori. Furthermore, the trip information is applied to the PHEV control strategy and to elevate the average engine operating efficiency to a higher level, while still assuring battery depletion at the end of the trip. A variable drive power demand distribution law is constructed to determine the drive power allocations to the engine and to the battery.

In order to achieve the above strategy, the first task is to plan on battery depletion profile given available trip information. In the minimal level, when only DUC is known/estimated, a linear or close to linear battery depletion profile can be constructed such as is shown in FIG. 2 with ECD. Such a battery depletion profile extends the battery charge depletion process to the whole range of the DUC.

The same strategy applies to the case where a linear or nonlinear battery profile is constructed on a segment of a driving trip with a given initial SOC at the beginning of the segment and target SOC at the end of the segment, or alternatively, SOC difference between the end and the start of the trip segment.

When a battery SOC profile is available, the next task is to control the PHEV battery SOC depletion process following the desirable battery SOC depletion profile as a reference in the spatial domain, which is achieved using the following PHEV control strategy.

First, a battery SOC depletion profile is generated for fuel economy improvement purpose with only the additional knowledge of DUC. This SOC profile linearly connects the initial SOC at the starting point of the trip to the predetermined charge sustaining SOC at the end of DUC, or a section of the DUC. The proposed SOC profile not only assures battery depletion before the next plug-in recharge event, but also evenly distributes the battery electric energy to the whole trip in the spatial domain.

For example, it is assumed that the drive power demand throughout the DUC is at a constant level, i.e. $P_{demand} = P_{demand\_ref}$. Along the SOC profile, at each distance instant, the reference battery power, $P_{batt\_ref}$, is determined by the following equation:

$$P_{batt\_ref} = \min(dSOC/dt * (Q_{batt} * V_{batt}))$$
$$= \Delta SOC/\Delta s * V_{veh} * (Q_{batt} * V_{batt}), P_{demand\_ref})$$

where $V_{veh}$ is the vehicle speed and $\Delta SOC/\Delta s$ is obtained from the SOC profile in the spatial domain:

$$\Delta SOC/\Delta s = (SOC_0 - SOC_{cs})/S$$

Where S is the total distance over which the CD process is extended. When the CD process is extended to the DUC, S=DUC.

Consequently, the engine power is determined:

$$P_{eng\_ref} = P_{demand\_ref} - P_{batt\_ref} \geq 0$$

The longer the DUC, the smaller the slope of the battery SOC profile in absolute value and thus the smaller the reference battery power. As a result, larger reference engine power is commanded to satisfy the total drive power demand. As the engine power increases, its efficiency is also improved. In order to avoid the engine efficiency entering the extremely high power and low efficiency region, the slope of the reference SOC profile is further limited.

The average engine operating efficiency at a constant power level throughout the DUC is higher or equal to that in a MCD plus CS process.

Figure 11:
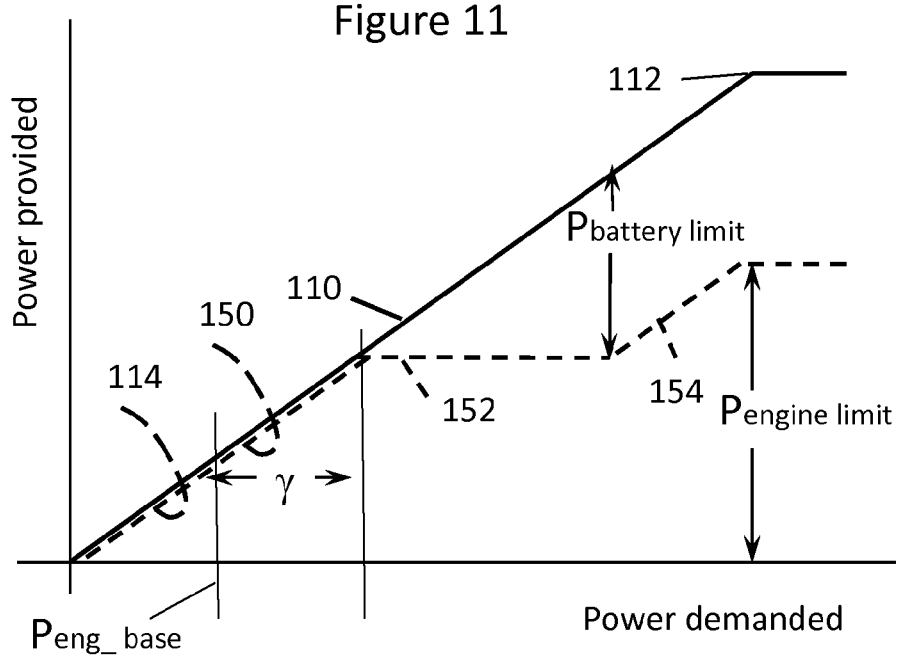
FIGS. 11 and 12 illustrate how control variables $\gamma$ and $\rho$ impact the proportion of demanded power provided by the engine and the electric motor according to an embodiment.

The remaining task is to enable the PHEV battery SOC depletion process to follow the reference SOC profile in the spatial domain in driving, which is achieved through the following PHEV control method. In FIG. 11, a strategy between CD operation (FIG. 7a) and CS operation (FIG. 9a) is shown. The engine provides the demanded power at low power levels, dashed line 114. At low power demands, between $P_{eng\_base}$ and $P_{eng\_base} + \gamma$, the engine also provides the power, dashed curve 150. The value of $\gamma$, an offset, is dynamically controlled to adjust the ratio of drive power distribution between the engine and the battery with respect to the real time drive power demand. As a result, a certain battery charge depletion rate is achieved with respect to the driving distance while following a desired SOC profile approximately as shown in FIG. 2. A power demand exceeding $P_{eng\_base} + \gamma$ is provided by the electric motor, dashed curve 152. When the battery limit is reached, any further demand in power is provided by the engine, dashed curve 154. The minimum $\gamma$ is $-(P_{eng\_base})$ at which maximal battery depletion rate is achieved. The maximum $\gamma$ caps the engine power to a desired high efficiency power level.

Figure 12:
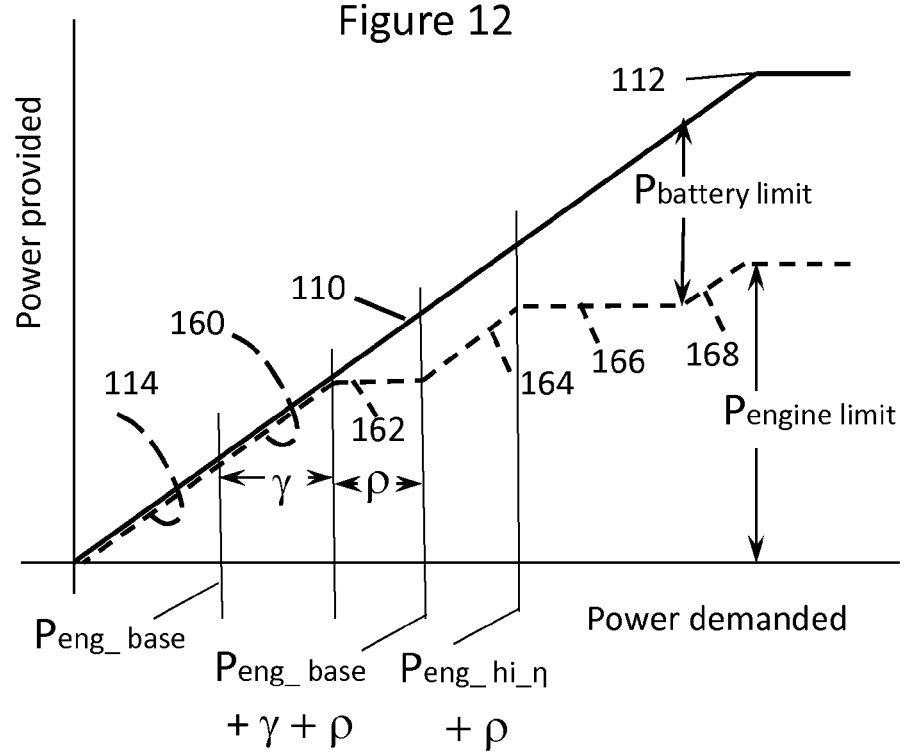

In FIG. 12, a more complicated strategy is shown. Very low power demands are provided by the engine, again shown as dashed curve 114. The engine provides power for demands less than $P_{eng\_base} + \gamma$, curve 160. For power demands just greater than $P_{eng\_base} + \gamma$, the battery provides the demanded power, curve 162. At power demands greater than $P_{eng\_base} + \gamma + \rho$, the engine provides the additional power, 164. The engine provides any additional demanded power in the range of $P_{eng\_base} + \gamma + \rho$ to $P_{eng\_hi\_\eta} + \rho$, where $P_{eng\_hi\_\eta}$ is an engine power at which the engine operates at, or near, its peak efficiency. Like $\gamma$, $\rho$ varies depending on the desired SOC vs. distance curve of FIG. 2. Rho is another offset and is dynamically controlled. Power demand greater than $P_{eng\_hi\_\eta} + \rho$ is provided by the battery, curve 166, until the battery power limit is reached. The engine supplies any additional power until both the engine and the battery reach their limits. In the strategy of FIG. 12, the engine is operating at high efficiency within the range shown by curve 166.

Another option (with reference to FIG. 12, but not shown) to match the actual SOC to the reference SOC is to apply a sloped line (or dashed line as used in the figures) after $P_{eng\_base}$ with an increasing ratio, $\beta$, or the slope angle of the sloped line. In this way, $\beta$ controls the power increasing rate between the battery and the engine and provides a linear relationship. As $\beta$ increases, or as the line becomes steeper, more drive power demand is allocated to the engine as the drive power demand increases. Otherwise, more battery power will be requested as $P_{demand}$ increases. At one end, $\beta=0$, and the power splitting rule is the same as the base strategy, basically showing a hold. At the other end, $\beta=45$ degrees, and there is no battery power used in any level of $P_{demand}$.

Figure 13:
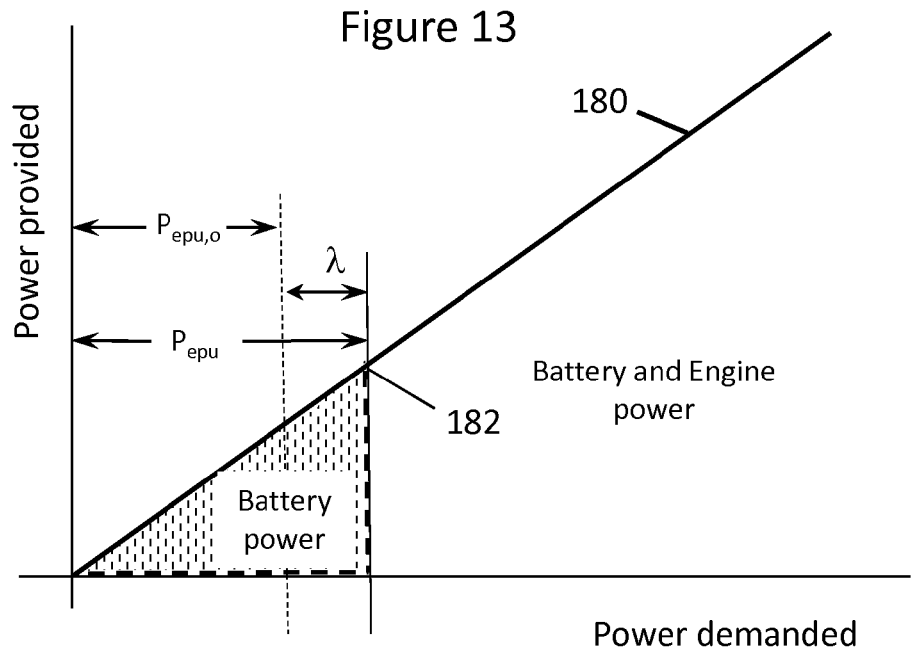
FIG. 13 illustrates how a control parameter $\lambda$ impacts the level of power at which power provided transitions from engine off operation to engine on operation according to an embodiment.

FIGS. 7a-12 are concerned with different scenarios of providing operator-demanded power at vehicle speeds or drive power demand greater than their thresholds at which the engine is always rotating. FIG. 13 is a scenario depicting vehicle operation with respect to $\lambda$. In the base PHEV energy management law, there are power threshold levels, say $P_{epu}$ and $P_{epd}$, to determine when to pull up the engine if the engine is off and when to pull down the engine when it is on with respect to the drive power demand. There is a hysteresis region between $P_{epu}$ and $P_{epd}$ and their values may be calibrated with respect to battery SOC in a lookup table to provide a basic engine on/off control characteristic. Often, a PHEV control process exhibits a certain amount of engine-on operation duration based on the base calibration and the value of lambda is one by default. When implementing the advanced DUC based strategy, more engine-on operation time may be requested when the battery SOC is less than the reference SOC to save more electricity. The negative SOC error will drag the value of lambda such that $0 < \lambda < 1$. The larger the negative SOC error, the closer the lambda value is to zero. Lambda is a multiplier to the base $P_{epu}$ and $P_{epd}$ power thresholds, which means that the working power threshold will be adjusted down to smaller values by lambda. Consequently, the engine is more likely to be in on operation as a higher distribution of $P_{demand}$ is brought to the engine on region. Similarly, for the converse case when the battery SOC is higher than the reference SOC, it is desirable to consume more electricity than the current state. One way to achieve this is to apply a longer EV (pure electric) driving duration. Thus, the positive SOC error will adjust the value of $\lambda$ to increase towards 1 or to a value greater than one, and according to the drive power demand distribution, less engine on operation will be requested throughout the driving cycle.

With respect to FIG. 13, an example of the use of $\lambda$, curve 180 shows power demanded and power provided. The default engine pull up, $P_{epu,0}$, is shown and is the default point at which the engine would be pulled up. The engine pull up has been changed based on $\lambda$, the multiplier, to a new higher value for engine pull up, $P_{epu}$, at 182. To the left of 182, battery power is used, i.e., up to the new $P_{epu}$. At power demands greater than $P_{epu}$, the engine is spun up and provides the power in conjunction with the battery based on a hybrid control strategy. Without the use of λ, the engine would have been pulled up at a lower power level at $P_{epu,0}$ and less electrical power would be used.

Figure 14:
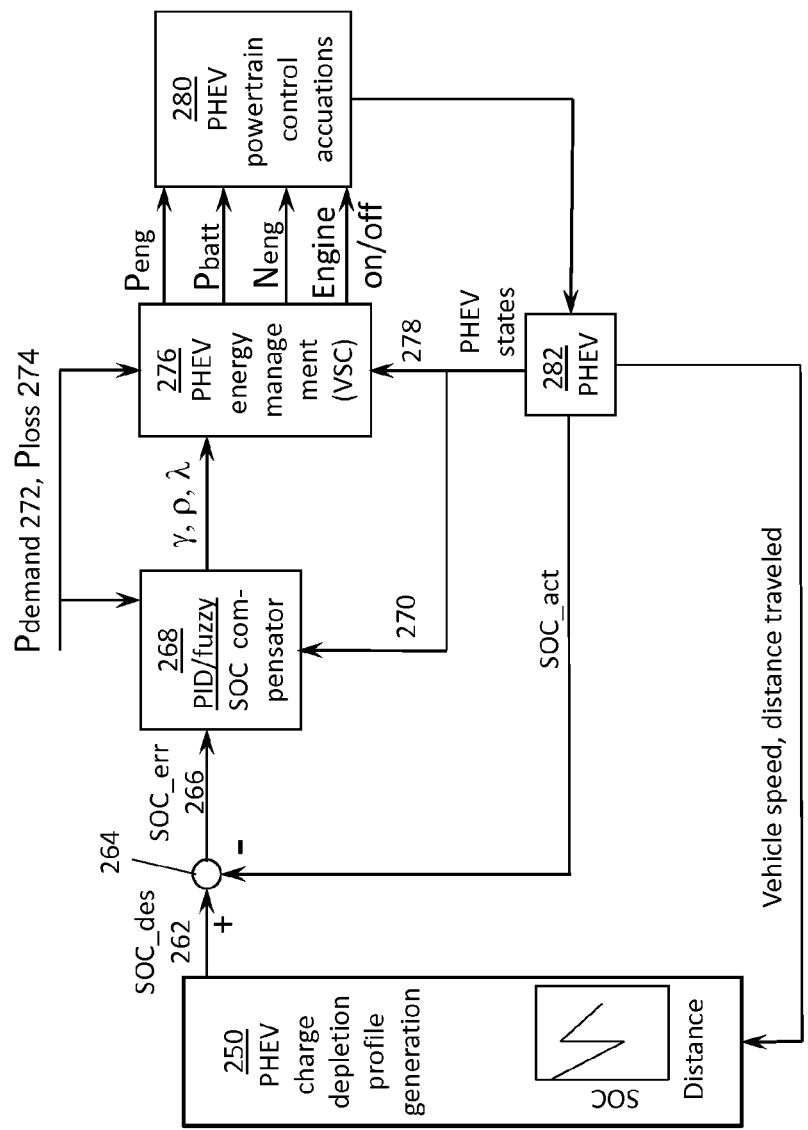
FIG. 14 illustrates a control strategy according to an embodiment.

A distance-based PHEV battery charge depletion energy management control structure is shown schematically in FIG. 14. A PHEV charge depletion profile is determined based on DUC, the state of charge at time 0, $SOC_0$ and $SOC\_\_{hold}$, a minimum level of battery charge to retain in the battery. Other inputs to the charge depletion profile generation may include: navigation information and traffic information, battery maintenance or durability factors, fuel efficiency considerations, emissions reduction, or other knowledge regarding intelligent vehicle usage/driving pattern recognition to provide a more accurate profile. The profile may be any charge depletion profile including linear, curvilinear, piecewise linear or the like, and additionally may be set for the length of the DUC or to a segment thereof. An output of 250 is SOC_des 262 as a function of distance. SOC_des is compared with SOC_act, the actual SOC, in comparator 264. The result is SOC_err 266, the error in SOC. SOC_err is an input to a PID/fuzzy SOC compensator 268. Other inputs to the PID/fuzzy SOC compensator 268 are PHEV states 270, power demanded by the vehicle operator, $P_{demand}$ 272, and the estimated system power loss, $P_{loss}$ 274. The values of λ and ρ, if engine is on, and the value of λ are output of block 268 and input to block 276 in which the VSC takes these inputs as well as PHEV states, 278, $P_{demand}$, 272, and $P_{loss}$, 274, to command the PHEV. In particular, the VSC determines the engine on-off state based on $P_{demand}$ with respect to the λ adjusted EPUD power threshold. It further determines a propulsion balance between the engine and the motor, i.e., $P_{eng}$ and $P_{batt}$ based on the gamma, rho adjusted drive power split thresholds. After that, the engine rotational speed, $N_{eng}$, is determined. This is related to a gear ratio that is commanded. Also, VSC determines whether the engine is on or off. The outputs in block 276 from VSC are provided to block 280, PHEV powertrain control actuations that are commanded to the PHEV 282. The distance traveled is communicated to 250, so that the new SOC_des 262 is based on the present distance traveled in the trip. Also, an output from PHEV 282 is the actual SOC, SOC_act, which is an input to comparator 264.

Figure 15:
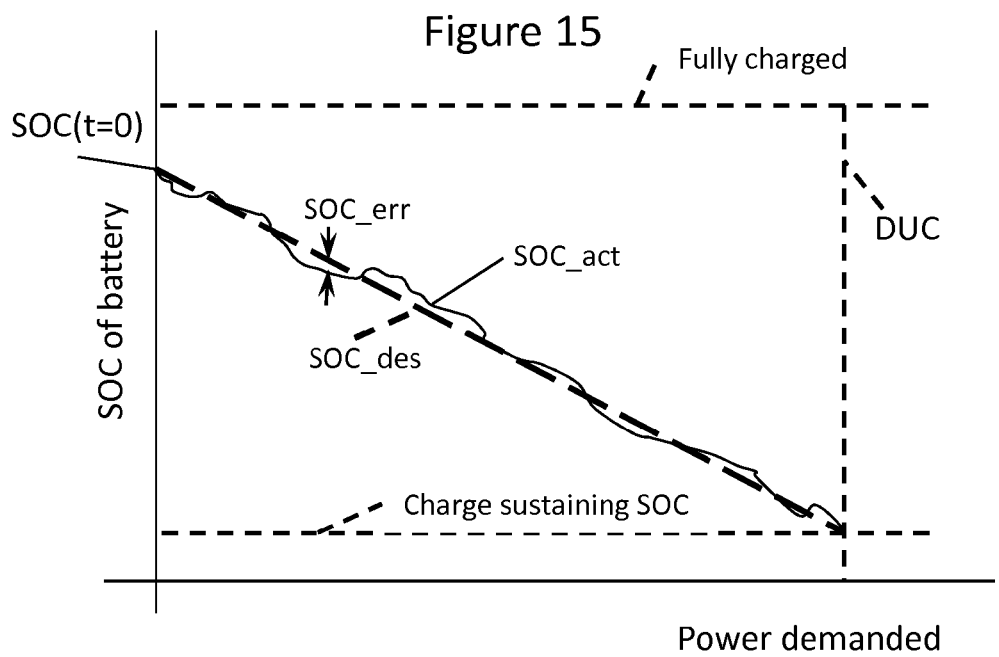
FIG. 15 is a plot of state of charge of the battery as a function of distance traveled showing both a desired trajectory and a simulated actual trajectory according to an embodiment.

In FIG. 15, actual SOC of the battery is shown as a function of distance for a DUC trip. SOC(t=0), the start of charge at the beginning of the trip is a little less than fully charged, about 97%. The desired SOC curve is shown as a dashed line from SOC(t=0) to a charge sustaining SOC at the end of the trip, DUC. Of course other desired SOC curves are also contemplated. The actual SOC is caused to be close to the desired. There are a couple of occurrences in where actual SOC increases slightly. These may be due to regenerative braking events. The actual operation of the vehicle is adjusted to accommodate such events so that actual SOC closely matches desired SOC throughout the trip.

The battery electric energy is controlled in such that it is depleted close to the end of DUC range or a selected segment of the trip. The electric energy is used to elevate the overall system operation efficiency throughout the travel distance. As a result, the PHEV energy utilization efficiency is improved, both in the vehicle domain and in the trip domain, such that a better overall fuel economy is expected.

When DUC is available and the DUC range is longer than the base CD range, it is necessary to adjust the battery electric power depletion rate to favor overall fuel economy improvement and system protections. To this end, the base charge depletion strategy has to be made flexible with additional control variables to adjust the battery power biasing level.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed. Additionally, the features of various implementing embodiments may be combined to form further embodiments of the invention.

What is claimed:

1. A method to control a plug-in electric vehicle (PHEV) having an electric motor and an engine, comprising:
    operating the electric motor and engine to correspond with a reference state of charge profile of a battery by controlling an engine on/off state to track the reference state of charge profile in a spatial domain, the reference state of charge profile based on a present state of charge (SOC) of the battery coupled to the electric motor, a desired minimum SOC, and a distance until charge (DUC), wherein the reference state of charge profile contains a decline period; and
    controlling, with an electronic controller, an engine on/off state to track the reference state of charge profile in the spatial domain using a power threshold value for engine pull up and pull down multiplied by a dynamic state control (λ) to change (i) an amount of time that the engine is operational and (ii) a base power level provided by the engine at pull up that alters a battery electricity depletion rate and a duration of electric-only operation for the vehicle thereby causing an actual state of charge profile of the battery to correspond with the reference state of charge profile;
    wherein, in response to the present SOC of the battery being less than the reference state of charge profile, the dynamic state control is less than one; and
    wherein, in response to the present SOC of the battery being greater than the reference state of charge profile, the dynamic state control is greater than one.

2. The method of claim 1 further comprising controlling a power output of the engine with a variable power distribution ratio between the engine and the electric motor in response to the engine being pulled up to cause an actual state of charge profile of the battery to correspond with the reference state of charge profile.

3. The method of claim 2 wherein the variable power distribution ratio includes an increasing ratio to provide a linear relationship for a ratio of drive power distribution between the engine and the battery with respect to a real time drive power demand when the real time drive power demand is above a predetermined base engine power output, such that the engine provides power when the drive power demand is below the predetermined base engine power output, and the increasing ratio allocates power provided by the engine and the electric motor when the drive power demand is above the predetermined base engine power output.

4. The method of claim 1 further comprising controlling an on/off state of the electric motor using a threshold value based on an offset value (γ) added to a predetermined base engine power output ($p_{eng\_base}$) such that the engine provides power to meet a drive power demand when the drive power demand is below the threshold value, and the electric motor provides increasing power to meet additional drive power demand when the drive power demand is above the threshold value, wherein the offset value (γ) is variable and dependent on the reference state of charge profile.

5. A plug-in hybrid electric vehicle (PHEV), comprising:
an electric motor;
a battery coupled to the electric motor;
an engine wherein the electric motor and the engine are coupled to wheels of the PHEV via a transmission; and
an electronic control unit (ECU) electronically coupled to the electric motor, the battery, and the engine wherein the ECU is configured to (i) receive distance-until-charged (DUC) information and a present state of charge (SOC) of the battery; (ii) calculate a reference state of charge profile containing a roughly linear decline in state of charge (SOC) in a battery coupled to the electric motor as a function of distance in which SOC achieves a minimum SOC at DUC; and (iii) command the electric motor and the engine to track the calculated roughly linear decline in SOC by controlling an on/off state of the engine, an on/off state of the electric motor, and a proportion of power provided by the engine and electric motor;
wherein the ECU is configured to control the engine on/off state using a power threshold value for engine pull up and pull down multiplied by a dynamic state control (λ) to change (i) an amount of time that the engine is operational and (ii) a base power level provided by the engine at pull up that alters a battery electricity depletion rate and a duration of electric-only operation for the vehicle thereby causing an actual state of charge profile of the battery to correspond with the reference state of charge profile;
wherein, in response to the present SOC of the battery being less than the reference state of charge profile, the ECU is configured to set the dynamic state control to be less than one; and
wherein, in response to the present SOC of the battery being greater than the reference state of charge profile, the ECU is configured to set the dynamic state control to be greater than one.

6. The PHEV of claim 5 wherein the DUC information is based on an input to the ECU via a human-machine interface.

7. The PHEV of claim 5 wherein the DUC information is based on data collected by the ECU concerning driving patterns of the PHEV.

8. The PHEV of claim 5, further comprising: a GPS navigation system coupled to the ECU wherein the ECU determines a DUC based on signals from the GPS navigation system.

9. The PHEV of claim 5 wherein the ECU estimates an actual SOC at the present distance; determines an SOC error based on a difference between desired SOC and actual SOC; and basing the commands to the electric motor and the engine to minimize the SOC error.

10. The PHEV of claim 9 wherein when the actual SOC is less than the desired SOC, the ECU commands the engine to provide a greater fraction of the operator demanded power.

11. The PHEV of claim 9 wherein when wherein when the actual SOC is greater than the desired SOC, the ECU commands the electric motor to provide a greater fraction of the operator demanded power.

12. The PHEV of claim 5 wherein the ECU is further configured to control an on/off state of the electric motor using a threshold value based on an offset value (γ) added to a predetermined base engine power output ($P_{eng\_base}$) such that the engine provides power to meet a drive power demand when the drive power demand is below the threshold value, and the electric motor provides increasing power to meet additional drive power demand when the drive power demand is above the threshold value, wherein the offset value (γ) is variable and dependent on the reference state of charge profile.

* * * * *